United States Patent
Eisenbud et al.

(10) Patent No.: US 9,560,124 B2
(45) Date of Patent: Jan. 31, 2017

(54) METHOD AND SYSTEM FOR LOAD BALANCING ANYCAST DATA TRAFFIC

(71) Applicant: Google Inc., Mountain View, CA (US)

(72) Inventors: Daniel Eugene Eisenbud, Mountain View, CA (US); Simon Jeffrey Newton, San Francisco, CA (US)

(73) Assignee: Google Inc., Mountain View, CA (US)

( * ) Notice: Subject to any disclaimer, the term of this patent is extended or adjusted under 35 U.S.C. 154(b) by 217 days.

(21) Appl. No.: 14/495,683

(22) Filed: Sep. 24, 2014

(65) Prior Publication Data

US 2015/0334179 A1    Nov. 19, 2015

Related U.S. Application Data

(60) Provisional application No. 61/992,623, filed on May 13, 2014.

(51) Int. Cl.
*H04L 29/08* (2006.01)

(52) U.S. Cl.
CPC ....... *H04L 67/1002* (2013.01); *H04L 67/1008* (2013.01); *H04L 67/1023* (2013.01); *H04L 67/1025* (2013.01); *H04L 67/1027* (2013.01); *H04L 67/1029* (2013.01)

(58) Field of Classification Search
CPC ............ H04L 67/1002; H04L 67/1008; H04L 67/1023; H04L 67/1029; H04L 67/1025; H04L 67/1027
See application file for complete search history.

(56) References Cited

U.S. PATENT DOCUMENTS

| | | | | |
|---|---|---|---|---|
| 7,355,977 B1* | 4/2008 | Li | ............................ | H04L 45/00 370/235.1 |
| 2006/0212597 A1* | 9/2006 | Shimada | .............. | H04L 67/1008 709/238 |
| 2010/0302940 A1* | 12/2010 | Patel | ................... | H04L 12/4633 370/230 |
| 2011/0145390 A1* | 6/2011 | Kakadia | .................. | G06F 9/505 709/224 |

OTHER PUBLICATIONS

International Search Report and Written Opinion mailed Aug. 21, 2015 in PCT Application No. PCT/US2015/030235.

* cited by examiner

*Primary Examiner* — Dustin Nguyen
*Assistant Examiner* — Juan C Turriate Gastulo
(74) *Attorney, Agent, or Firm* — McDermott Will & Emery LLP (57) ABSTRACT

In some implementations, a system and corresponding method for load balancing data traffic addressed to an anycast address include maintaining, by each of a plurality of load balancing (LB) devices a data structure including entries associated with application instances in a group of application instances served by the LB device. The frequency with which each served application instance is included in the data structure is indicative of a weight value associated with a capacity of the corresponding served application instance. Upon receiving a data packet, originally addressed to an anycast address, the LB device uses one or more header fields of the received data packet to identify a virtual Internet protocol (IP) address of one of the served application instances in the data structure maintained by the LB device. The LB device then forwards the data packet to the identified application instance.

22 Claims, 7 Drawing Sheets

| | Weights | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| 1. | A:1.0; B:0.0 | A_2 | A_3 | A_1 | A_1 | A_1 | A_3 | A_3 | A_1 | A_2 | A_1 | A_2 | A_3 | A_2 | A_1 | A_3 | A_2 | A_2 |
| 2. | A:0.9; B:0.1 | A_2 | A_3 | A_3 | A_1 | A_1 | A_3 | B_2 | A_1 | B_3 | A_1 | A_2 | B_1 | A_2 | A_3 | A_2 | A_1 | A_2 |
| 3. | A:0.8; B:0.2 | A_2 | A_3 | B_1 | A_1 | A_1 | A_3 | B_2 | A_1 | B_3 | A_1 | A_2 | B_1 | A_2 | A_3 | A_2 | A_1 | A_2 |
| 4. | A:0.7; B:0.3 | A_2 | A_3 | B_3 | A_1 | A_1 | A_3 | B_2 | A_1 | B_3 | A_1 | A_2 | B_1 | A_2 | A_3 | A_2 | B_2 | B_3 |
| 5. | A:0.6; B:0.4 | A_2 | A_3 | B_3 | A_1 | A_1 | A_3 | B_2 | A_1 | B_3 | A_1 | A_2 | B_1 | A_2 | A_3 | A_2 | A_1 | A_2 |
| 6. | A:0.5; B:0.5 | A_2 | A_3 | B_3 | A_1 | B_1 | A_3 | B_2 | A_1 | B_3 | B_2 | A_2 | B_1 | A_2 | A_3 | A_3 | A_1 | B_2 |
| 7. | A:0.4; B:0.6 | A_2 | A_3 | B_3 | A_1 | A_1 | A_3 | B_2 | A_1 | B_3 | B_2 | A_2 | B_1 | A_2 | B_1 | B_1 | B_2 | B_3 |
| 8. | A:0.3; B:0.7 | B_1 | A_3 | B_3 | A_1 | B_2 | A_3 | B_2 | A_1 | B_3 | B_2 | A_2 | B_1 | A_2 | B_1 | B_1 | B_2 | B_3 |
| 9. | A:0.2; B:0.8 | B_1 | A_3 | B_3 | A_1 | B_2 | A_3 | B_2 | B_1 | B_3 | B_2 | A_1 | B_1 | A_2 | B_3 | A_2 | B_2 | B_3 |
| 10. | A:0.1; B:0.9 | B_1 | B_1 | B_3 | B_1 | B_2 | B_1 | B_2 | B_1 | B_3 | B_2 | B_2 | B_1 | B_2 | B_3 | B_1 | B_2 | B_3 |
| 11. | A:0.0; B:1.0 | B_1 | B_1 | B_3 | B_1 | B_2 | B_2 | B_2 | B_3 | B_3 | B_2 | B_2 | B_1 | B_2 | B_3 | B_1 | B_2 | B_3 |

Figure 7

METHOD AND SYSTEM FOR LOAD BALANCING ANYCAST DATA TRAFFIC

RELATED APPLICATION

The present application claims priority to U.S. Provisional Application No. 61/992,623, entitled "METHOD AND SYSTEM FOR LOAD BALANCING ANYCAST DATA TRAFFIC" and filed on May 13, 2014, which is incorporated herein by reference in its entirety for all purposes.

FIELD OF THE DISCLOSURE

The present disclosure relates generally to the field of data traffic load balancing.

BACKGROUND

Much of the world's Internet-accessible content is provided by servers hosted in large data centers. Such data centers are typically distributed across multiple geographical locations, and serve end-users globally. A typical data center houses thousands of servers hosting multiple instances of software applications associated with different services provided to end-users. When an end-user makes a request for Internet content associated with, for example, a web site, social media service, streaming media content item, gaming service, or any other online service, the request is sent to an application instance associated with the service hosted by a data center to serve the end-user's request.

SUMMARY

According to one aspect of the disclosure, a method for load balancing data traffic addressed to an anycast address includes maintaining, by each load balancing (LB) device of a first set of LB devices, a first data structure including entries associated with application instances in a group of application instances served by the LB device of the first set of LB devices. The frequency with which each served application instance is included in the first data structure is indicative of a weight value associated with a capacity of the corresponding served application instance. Upon an LB device in the first set of LB devices receiving a data packet originally addressed to an anycast address, the LB device generates a first hash value based on a first set of header fields of the received data packet. The LB of the first set then uses the first data structure to identify a virtual Internet protocol (IP) address of one of the served application instances based on the generated first hash value, and forwards the data packet to the identified application instance. The method also includes maintaining, by a LB device of a second set of LB devices, a second data structure including entries associated with respective LB devices in the first set, the frequency with which each LB device in the first set of LB devices is included in the second data structure is indicative of a weight value associated with the corresponding LB device of the first set. Upon an LB device of the second set of LB devices receiving a data packet originally addressed to the anycast address, the LB generates a second hash value based on a second set of header fields of the received data packet, and identifies a LB device of the first set using the second data structure, based on the generated second hash value. The LB of the second set then forwards the data packet to the identified LB device of the first set of LB devices.

According to another aspect of the disclosure, a system for load balancing anycast traffic in a communications network includes a first set of load balancing (LB) devices. Each LB device of the first set of LB devices is configured to maintain a first data structure including entries associated with application instances in a group of application instances served by the LB device of the first set of LB devices. The frequency with which each served application instance is included in the first data structure is indicative of a weight value associated with a corresponding served application instance. Upon an LB device of the first set of LB devices receiving a data packet, received at the system addressed to an anycast address, the LB device generates a first hash value based on one or more first header fields of the received data packet, and uses the first data structure to identify a virtual Internet protocol (IP) address of one of the served application instances based on the generated first hash value. The LB device of the first set then forwards the data packet to the identified application instance. The system also includes a second set of load balancing LB device. Each LB device of the second set of LB devices is configured to maintain a second data structure including entries associated with respective LB devices in the first set. The frequency with which each LB device in the first set of LB devices is included in the second data structure is indicative of a weight value associated with the corresponding LB device of the first set. Upon an LB device in the second set of LB devices receiving a data packet, received at the system addressed to the anycast address, the LB device generates a second hash value based on one or more second header fields of the received data packet, and identifies a LB device of first set of LB devices using the second data structure, based on the generated second hash value. The LB device of the second set then and forwards the data packet to the identified LB device of the first set. The system further includes an anycast node associated with the anycast address configured to, upon receiving a data packet addressed to the anycast address, forward the received data packet to a LB device in the second set of LB devices.

BRIEF DESCRIPTION OF THE DRAWINGS

The above and related objects, features, and advantages of the present disclosure will be more fully understood by reference to the following detailed description, when taken in conjunction with the following figures, wherein.

Like reference numbers and designations in the various drawings indicate like elements.

DETAILED DESCRIPTION

Online services or applications usually include multiple application instances for each application or service. The multiple application instances for each application or service may reside on multiple computer servers. As such, the load associated with accessing an application or service by multiple end-users may be distributed across at least a subset of the corresponding multiple application instances. Also, distributing the multiple application instances for a given application or service across different geographical locations helps reduce latency experienced by end-users. In particular, an end-user may be served by the closest geographical location having one or more of the corresponding multiple application instances. While serving each end-user or client by the corresponding closest geographical location reduces latency, the computer servers in each geographical location, and the application instances therein, have a finite capacity. When demand for a given application or service at a particular location exceeds the capacity of the applications instances in the same location, excess demand for the application may overflow to the next closest location.

In order to address the finite capacities of the computer servers and the application instances executed thereon, domain name system (DNS) servers have been traditionally employed in existing data centers to perform load balancing functionalities. In the following, implementations of processes, apparatuses, and systems for load balancing anycast data traffic are presented.

In anycast-based services or applications, one or more Internet protocol (IP) addresses are advertised, from multiple servers, globally using anycast. The anycast IP address for a given application or service is then used by end-users when accessing the same application or service. Data traffic associated with the anycast address, e.g., requests from end-users to access the application or service, is then load balanced across different corresponding application instances as depicted in the implementations described below. Data traffic associated with an anycast address is also referred to herein as anycast traffic or anycast data traffic. In some implementation, anycast traffic associated with stateful protocols, e.g., transport control protocol (TCP), is load balanced and served while corresponding connections are maintained even as Internet routing tables change. Furthermore, implementations described below can allow for specifying capacities or other load balancing metrics for different locations, and allow for rapid load balancing responses to changes in load, capacity, or any other load balancing metrics.

Figure 1:
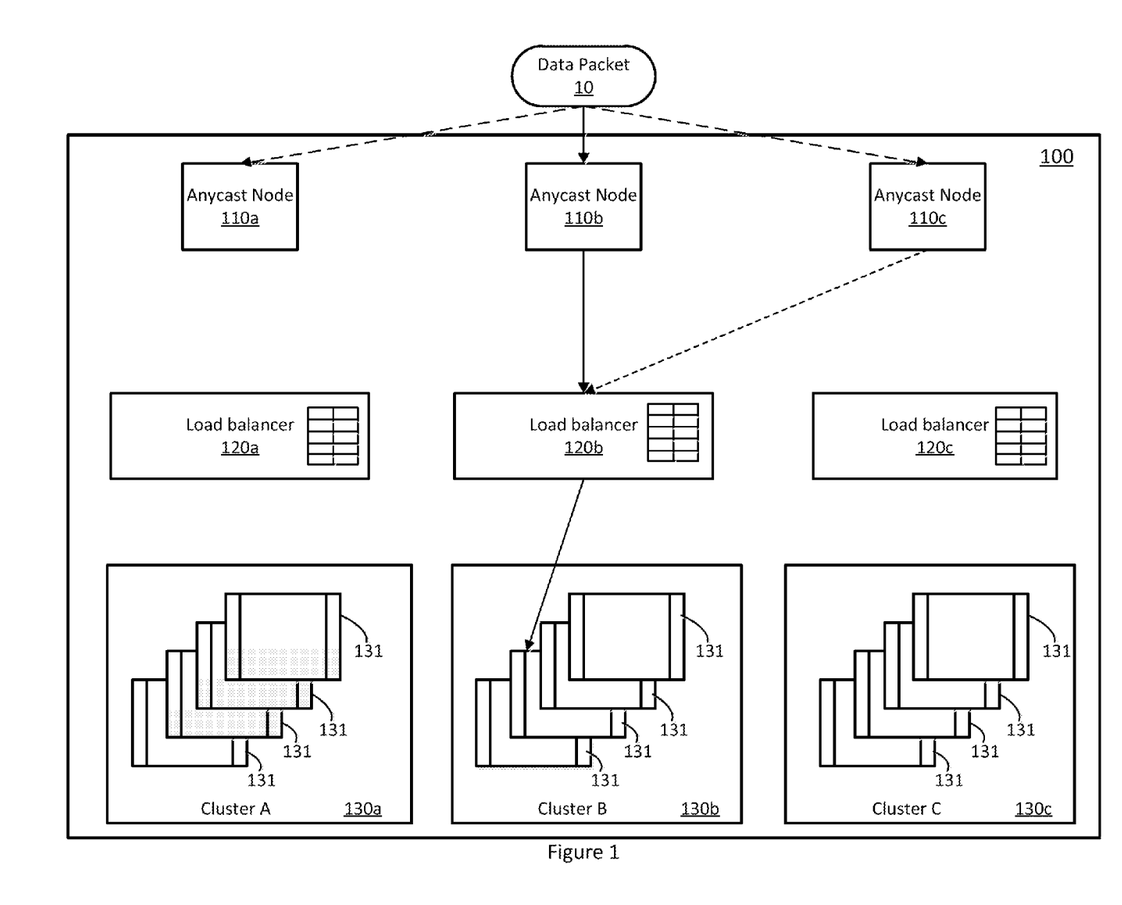
FIG. 1 shows a block diagram of an implementation of a single-layer load balancing system for load balancing data traffic addressed to an anycast address.

FIG. 1 shows a block diagram of an implementation of a single layer load balancing system 100 for load balancing data traffic addressed to an anycast address. The system 100 includes multiple anycast redirector nodes 110a-110c (also referred to hereinafter either individually or collectively as anycast node(s) 110) load balancer devices 120a-120b (also referred to hereinafter either individually or collectively as load balancer(s) 120) and multiple server clusters 130a-130c (also referred to hereinafter either individually or collectively as cluster(s) 130). Each of the clusters 130 includes a number of application instances 131.

A data packet 10 addressed to an anycast address is received at the system 100 by an anycast node 110. For example, the data packet 10 is received by the anycast node 110. The anycast nodes 110 are devices configured to receive data packets 10 addressed to an anycast address, and redirect the received data packets to corresponding load balancers 120. In some instances, an anycast node 110 redirects a received data packet 10 to a corresponding load balancer 120. In other instances, the receiving anycast node 110 redirects the received data packet 10 to a pool of load balancers 120 serving one or more respective clusters 130 of the system 100.

In some implementations, each anycast node 110 maintains, or has access to, a respective map mapping source Internet protocol (IP) addresses to corresponding clusters 130 or load balancers 120 associated with such clusters. The map is also referred to as a source IP map. In some instances, each source IP address is mapped to the cluster 130, or corresponding load balancer(s) 120, that is closest to the data packet source associated with the same source IP address. A person skilled in the art should appreciate that the mappings between source IP addresses and clusters 130, or load balancers 120, may be defined differently, for example, based on assignments made by administrators of the system 100. Upon receiving the data packet 10 addressed to the anycast address, the anycast node 110 looks up the packet's source Internet protocol (IP) address in the source IP map, and redirects the data packet 10 to a mapped location, i.e., a location associated with the source IP address in the source IP map. The mapped location is indicative of a load balancer 120 or a pool of load balancers 120 of the system 100.

In some implementations, the anycast node 110 uses several header fields of the received data packet 10 to determine a load balancer 120, or a pool of load balancers 120, to which the received data packet 10 is to be redirected. For instance, the receiving anycast node 110 uses a destination IP address (such as a virtual IP (VIP) address) and a source port associated with the received data packet 10 to determine an anycast service group among multiple anycast service groups. In some implementations, the receiving anycast node 110 can use the destination address, the destination port, the source IP address, the source port, the protocol, or any combination thereof to determine the anycast service group. The receiving anycast node 110 may also use other information included in the data packet payload such as a connection identifier (ID) or the like. For example, two anycast service groups may be defined, one using end-point servers for backend load balancing and another employing load balancing servers for backend load balancing. End-point servers are configured to terminate a transport control protocol (TCP) connection. In other examples, different anycast service groups may be defined. In mapping the packet's destination IP address and source port to the corresponding anycast service group, the receiving anycast node 110 makes use, for example, of a second map or configuration information indicative of such mappings. The receiving anycast node 110 further employs the source IP address of the received data packet 10 and the source IP map associated with receiving anycast node 110 to determine a zone, e.g., one or more clusters 130, of the system 100. In some implementations, a single source IP map is shared by all anycast nodes 110. In other implementations, different anycast nodes 110 may be associated with distinct source IP maps. In some implementations, each source IP map is associated with a respective service. The receiving anycast node 110 then maps the determined zone and the determined anycast service group to a load balancer 120 or a pool of load balancers 120 based on, for example, a third map. The receiving anycast node then redirects the received data packet 10 to the determined load balancer 120 or the determined pool of load balancers 120.

A person of ordinary skill in the art should appreciate that using a global mapping, e.g., a source IP map, makes redirecting of data packets 10 by the anycast nodes 110 consistent. In other words, if the data packet is received at the anycast node 110c instead of the anycast 110b, the anycast node 110c will, using the source IP map, redirect the data packet 10 to the same load balancer that would have been selected by the anycast node 110b.

The receiving anycast node 110 can be further configured to check a connection table to determine whether the received data packet 10 corresponds to a data flow, or session, recently served by the receiving anycast node 110. If the received data packet corresponds to a data flow or session indicated in the connection table, the receiving anycast node 110 forwards the received data packet 10 to a destination associated with the corresponding data flow or session. Otherwise, the receiving anycast node 110 determines a load balancer 120, or a pool of load balancers 120, as described above, and redirects the received data packet 10 to the determined load balancer 120 or the determined pool of load balancers 120.

In some implementations, each load balancer 120 is a computing device including a processor and a memory. The memory stores computer code instructions and a data structure 121 associated with the anycast address to which the data packet 10 is originally addressed. The computer code instructions include a software load balancer for load balancing data packets associated with the anycast address. The load balancer 120 may include multiple software load balancers associated with the same anycast address and/or multiple software load balancers associated with multiple anycast addresses. The data structure 121 is employed by the load balancer 120 to map data packets associated with the anycast address to corresponding application instances 131 residing in the clusters 130. In some instances, each load balancer 120 includes a separate data structure for each anycast address served by the same load balancer 120. The processor is configured to execute the computer code instructions stored in the memory. A person of ordinary skill in the art should appreciate that each load balancer 120 may include multiple processors and/or multiple memories. The load balancers 120 include a computer server, an end-point server that terminates TCP connection, other electronic devices configured to perform load balancing as described herein, or combinations thereof.

In some instances, the load balancers 120 are distributed across different geographical areas of the system 100. For example the load balancers 120a, 120b, and 120c, serve corresponding clusters 130a, 130b, and 130c, respectively. In other instances, a load balancer 120 may serve more than one cluster 130. A load balancer 120 may serve a zone of the system 100. A zone herein refers to one or more clusters 130 of the system 100 which are related, for example, based on corresponding geographical locations or other criteria. For instance, a zone may include multiple clusters 130 located at close geographic proximities to each other such as within a same data center. In other instances, a zone may include more distant clusters 130 inter-connected through relatively high speed communication links. Also, a zone may be served by a pool of load balancers.

In instances where the received data packet 10 is redirected by the anycast node 110 to a pool of load balancers 120, equal-cost multi-path (ECMP) routing may be employed to forward the received data packet to a specific load balancer 120 of the pool of load balancers 120. For example, a device receiving the data packet 10 generates an integer hash value based on header fields of the data packet 10, e.g., the packet's five-tuple, including protocol, source IP address, destination IP address, source port, and destination port. The receiving device then determines the destination load balancer 120 based on the generated hash value modulo a size of a table including identifications of the load balancers 120. In some implementations, the receiving device determines the destination load balancer 120 using the same or substantially similar algorithm as used by the load balancer 120 as described further below. The receiving device then delivers the data packet 10 to the destination load balancer 120 by either rewriting the packet's layer-two Ethernet header to point to the destination load balancer 120, or by encapsulating the data packet 10 with a generic routing encapsulation (GRE) header and an outer IP header. The same approach may be employed by a load balancer 120 including multiple software load balancers serving the packet's destination IP address to forward the received data packet 10 to one of the multiple software load balancers.

Upon receiving the data packet 10, the receiving load balancer 120, or a software load balancer thereon, generates a hash value based on one or more header fields of the data packet 10, e.g., the packet's five-tuple including protocol, source IP address, destination IP address, source port, and destination port. In some implementations, the data structure 121 includes entries associated with a group of application instances 131 served by the receiving load balancer 120. The group of application instances 131 correspond to an application or service associated with the anycast address to which the data packet 10 was addressed when arriving at the system 100. The receiving load balancer 120 then uses the generated hash value and the data structure 121 to determine a destination IP address of an application instance 131 of a group of application instances served by the receiving load balancer 120. The receiving load balancer 120 then forwards the data packet 10 to the determined application instance 131.

In some implementations, the data structure 121 is designed in a way that the frequency with which each application instance 131 is included in the data structure 121 reflects a weight associated with the same application instance 131. The weight associated with the application instance 131 is indicative of a load balancing metric such as capacity, processing time, or other criteria relevant in deciding to which application instance 131 the data packet is to be forwarded. That is, the weight associated with each application instance 131 may reflect how busy or how free the application instance 131 is. Alternatively, the weight associated with a given application instance 131 may reflect how fast or how slow processing the data packet 10 would be if the same application instance 131 is used. Capacity of each application may be defined in terms of packets per second, connections, or synchronize (SYN) packets per second, bandwidth, or the like. Processing time may be defined in terms of round trip time (RTT), or other metrics known in the art. In the data structure 121, the more frequent an application instance 131 is included, the more likely the same application instance 131 is to be selected for processing the request associated with the data packet 10.

The receiving load balancer 120 uses the generated hash value to select an entry of the data structure 121. For instance, the receiving load balancer 120 may select the data structure entry with index equal to the generated hash value modulo a size of the data structure or the size of an element portion of the data structure. Each entry of the data structure 121 is indicative of a corresponding application instance 131. For instance, each entry of the data structure 121 includes a destination IP address of a corresponding application instance 131. The receiving load balancer 120 then forwards the data packet 10 to the application instance 131 with the destination IP address obtained from the selected data structure entry.

In some implementations, the data structure 121 is a single table with each row or alternatively each column, including entries for application instances associated with a corresponding location, e.g., a cluster 130 or zone, of the system 100. As such, the receiving load balancer 120 may first select a row, or alternatively a column, and then select an entry within the selected row, or alternatively the selected column, based on the generated hash value. In some implementations, the data structure 121 includes multiple tables with each table corresponding to a location, e.g., a zone or cluster 130, of the system 100. In such a case, the receiving load balancer 120 may first select a table, and then select an entry within the selected table based on the generated hash value.

The receiving load balancer 120 may select a table, or sub-table such as a row or a column, corresponding to a location of the system 100 in different ways. For instance the selection may be based on a map associating IP subnets to corresponding locations of the system 100. Such map may be defined by observing at what location of the system 100 traffic from each IP subnet usually arrives. Alternatively, the map may be defined based on assignments made by administrators of the system 100, or based on RTT and distances between IP subnets and locations 130 of the system 100. The receiving load balancer 120 looks up the source IP address associated with the received data packet 10 in the map, and gets back either a location or a weighted list of locations. If a weighted list of location is retrieved from the map, the receiving load balancer may select a location from the list based on the corresponding weights and another hash value generated using one or more header fields, e.g., the five tuple, of the data packet 10. However, if no weighted list is used, the receiving load balancer 120 checks whether the closest location indicated in the map has enough available capacity to handle the data packet 10. If yes, the closest location is selected, otherwise the next closest location as indicated in the map is checked and so on. Given that each location is associated with a corresponding table, or sub-table, the receiving load balancer 120 selects a table, or sub-table, for use in determining a destination application instance 131 for the data packet 10 when selecting a location from the map. A person skilled in the art should appreciate that the data structure 121 may alternatively include one or more trees or any other data structures known in the art instead of one or more tables.

The receiving load balancer 120 may also check a connection table, prior to selecting an application instance 131, to determine if the received data packet 10 corresponds to a flow or session associated with an existing connection. If the received data packet 10 is found to be associated with an existing connection, the data packet 10 is forwarded to an application instance associated with the connection in the connection table. Otherwise, the receiving load balancer 120 determines an application instance 131 from the data structure 121 and forwards the data packet 10 to the determined application instance 131. Also, upon receiving the data packet 10, the load balancer 120 may further de-capsulate the data packet 10 if the later has been previously encapsulated one or more times. As such, the receiving load balancer 120 de-capsulates the data packet 10 until the inner packet is reached, and then retrieves any header fields for use in determining an application instance 131 to process the data packet 10.

Each cluster 130 includes one or more computer servers, e.g., content delivery servers and/or application servers, that maintain application instances associated with one or more services. In FIG. 1, each of the clusters 130*a*-130*c*, includes a number of application instances 131 associated with the application or service accessed through the anycast address to which the data packet 10 was addressed when arriving at the system 100. The application instances 131 in a given cluster 130 may reside in a single computer server, or may be distributed among multiple computer servers of the same cluster 130. The application instances 131 are addressed through corresponding destination IP addresses. An application instance as referred to herein includes a copy of a server application serving requests of end-users of a web page or an application, such as an email application, game application, social media application, calendar application, or any other online application. The application instance 131 receiving the data packet 10 processes the request associated with the data packet 10.

Figure 2:
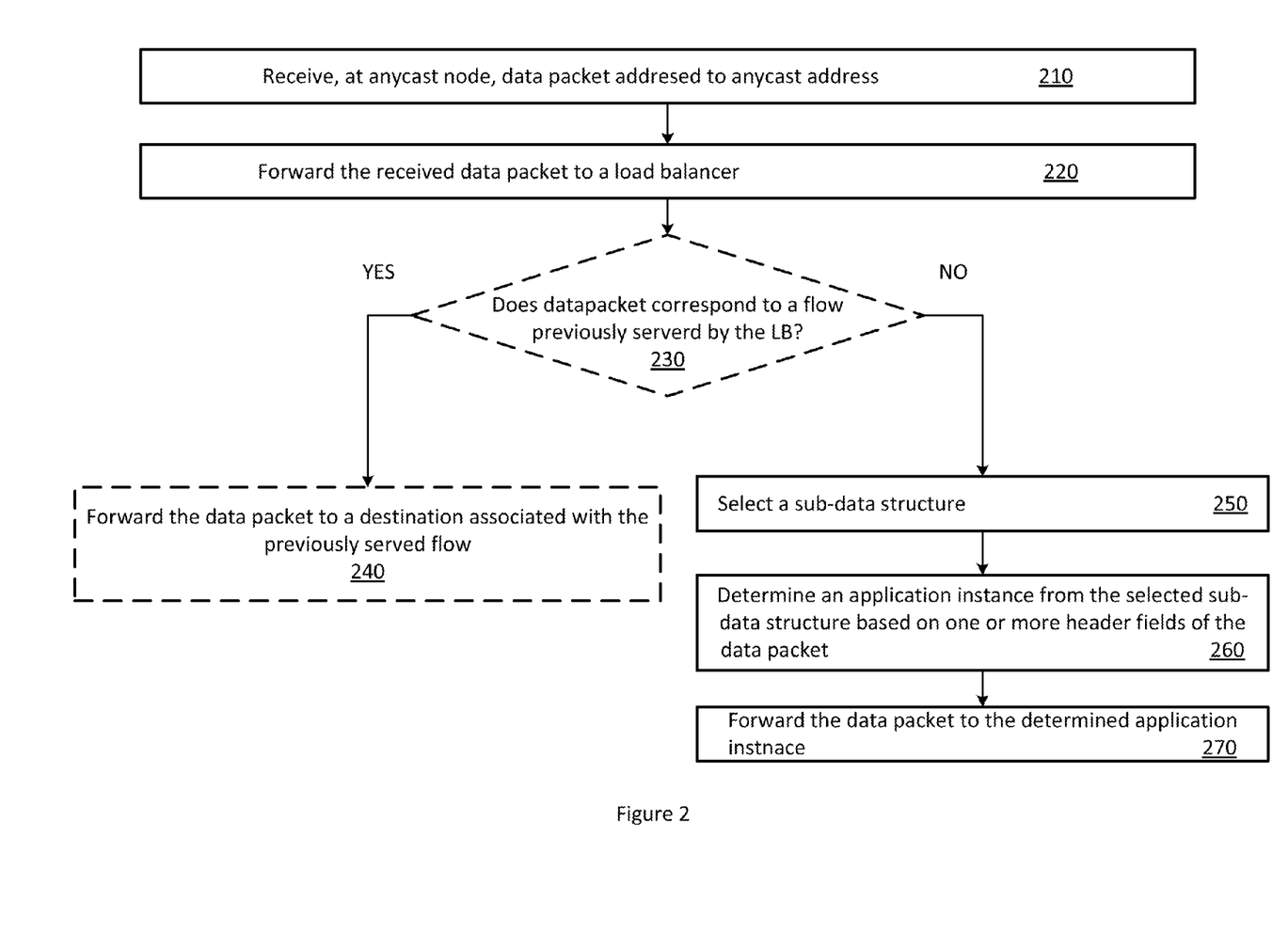
FIG. 2 shows a flowchart describing an implementation of a process of processing anycast data packets performed by the single-layer load balancing system.

FIG. 2 shows a flowchart describing an implementation of a process 200 of processing anycast data packets performed by the single-layer load balancing system 100. The process 200 includes the processes of receiving by an anycast node 110 a data packet 10 addressed to an anycast address (stage 210), forwarding by the anycast node 110 the received data packet 10 to a load balancer 120 (stage 220), and determining by the load balancer 120 if the data packet is associated with a previously served flow or session (stage 230). If the data packet is determined to be associated with a previously served flow or session, the process 200 includes forwarding the data packet 10 to application instance associated with the previously served flow or session (stage 240). Otherwise, the process 200 includes selecting a sub-data structure from multiple sub-data structures (stage 250), determining an application instance 131 based on the selected sub-data structure and one or more header fields of the data packet 10 (stage 260), and forwarding the data packet to the determined application instance (stage 270).

When end-users request or consume an online service associated with an anycast address, corresponding data packets sent from the end-users are addressed to the same anycast address. One or more anycast nodes 110 receive the data packets addressed to the anycast address (stage 210). For instance, each data packet addressed to the anycast address is received by the closest anycast node 110 to the source of the data packet. Upon receiving a data packet addressed to the anycast node (stage 210), a receiving anycast node may check a connection table to determine whether the received data packet is associated with a previously served flow or session, e.g., an already established connection. If the data packet is determined to be associated with an existing flow or session, the receiving anycast node 110 forwards the data packet to a next hop associated with the existing flow or session. The checking of the connection table is optional as it may be carried out by another network element or device, other than the receiving anycast node 110 or it may be skipped entirely.

If the data packet is determined not to be associated with an existing flow or session such as a synchronize (SYN) data packet or a data packet where flow had previously been by a different anycast node, or no checking is performed by the receiving anycast node 110, the anycast node forwards the data packet to a load balancer (LB) 120 (stage 220). In forwarding the data packet (stage 220), the receiving anycast node 110 may determine the load balancer 120 based on one or more header fields, e.g., source IP address, destination IP address, and/or source port, of the data packet and a sub-data structure associated with the receiving anycast node 110. Also, the anycast node 110 may de-capsulate the data packet and/or encapsulate it with one or more new headers before forwarding the data packet to the load balancer 120.

Upon receiving the data packet, the load balancer 120 may check a connection table to determine whether the received data packet is associated with a previously served flow or session, e.g., an already established connection (stage 230). If the data packet is determined to be corresponding to an existing flow or session, the LB 120 forwards the data packet to the application instance serving the existing flow or session (stage 240). The checking of the connection table is optional as it may be carried out by another network element or device, other than the LB 120 or it may be skipped entirely.

If the data packet is determined not to be associated with an existing flow or session such as a synchronize (SYN) data packet or a data packet where flow had previously been by a different anycast node, or no checking is performed by the LB 120, the LB selects a sub-data structure from a data structure 121 maintained by the LB 120 (stage 250). For instance, if the data structure 121 is a single table, the selected sub-data structure may be a row or column of the table. In other instances where the data structure 121 includes multiple tables, the selected sub-data structure is table of the multiple tables. The selection of the sub-data structure may be based on header field(s) of the data packet and a sub-data structure between IP subnets and corresponding locations of the system 100. Alternatively, the selection may be based on header field(s) of the data packet and a list of the sub-data structures reflecting a weight for each sub-data structure in the list. Each sub-data structure of the data structure 121 represents a redundant list of application instances 131 associated with a corresponding location, e.g., a cluster 130 or zone, of the system 100. The frequency with which an application instance 131 is included in a corresponding sub-data structure is dependent on a weight value associated with the same application instance 131.

The LB 120 then determines an application instance 131 from the selected sub-data structure using one or more header fields of the data packet (stage 260). For instance, the LB 120 generates a hash value using the one or more header fields of the data packet and then uses the generated hash value to determine an entry of the sub-data structure. The LB 120 may calculate the generated hash value modulo the size of the sub-data structure and use the result as an index for the entry selected. A person of ordinary skill in the art should appreciate that the header field(s) of the data packet may be used in different ways to identify an entry of the sub-data structure for selection. Each entry of the selected sub-data structure includes an IP address, e.g., a destination IP address, associated with a corresponding application instance 131. The LB 120 then forwards the data packet to the determined application instance 131 (stage 270), where the request associated with the data packet is served.

Figure 3:
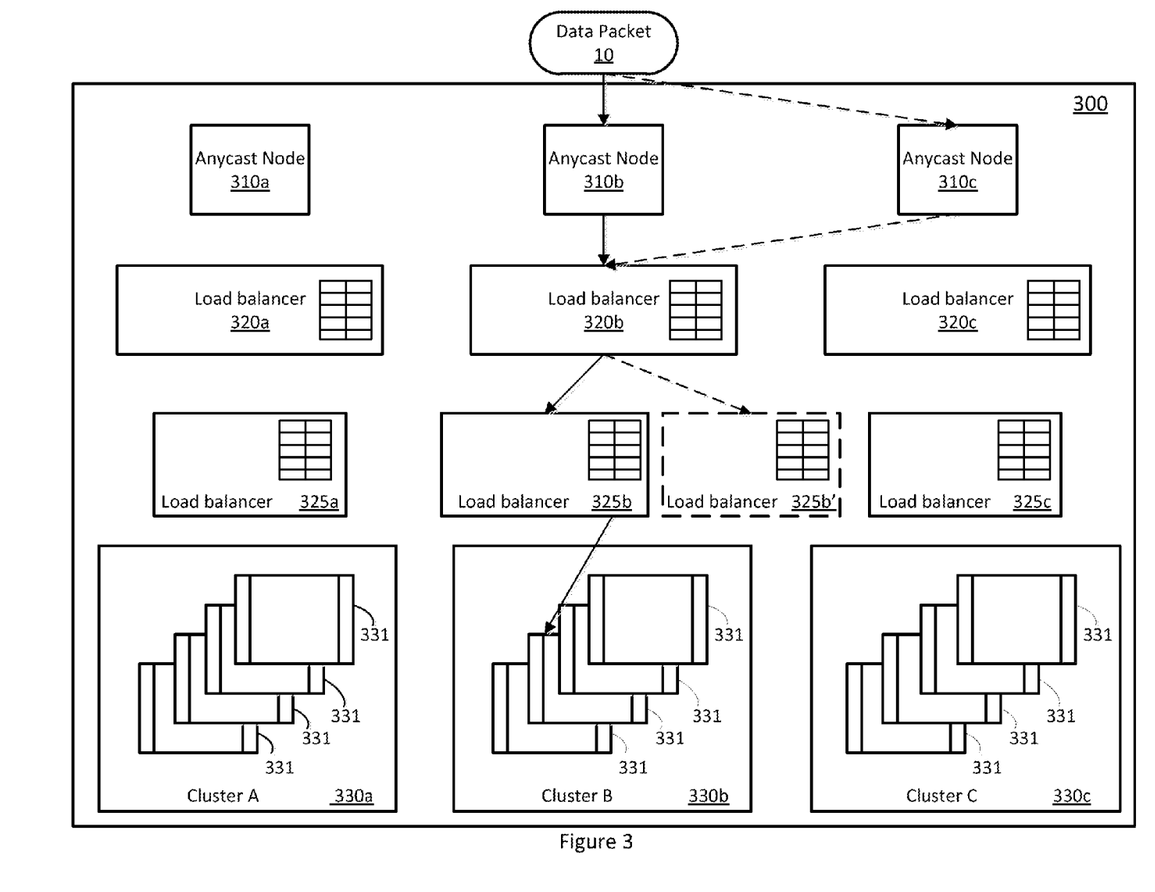
FIG. 3 shows a block diagram of an implementation of a two-layer load balancing system for load balancing data traffic addressed to an anycast address.

FIG. 3 shows a block diagram of an implementation of a two-layer load balancing system 300 for load balancing data traffic addressed to an anycast address. The system 300 includes anycast redirector nodes 310a-310c, also referred to hereinafter either individually or collectively as anycast node(s) 310, first-layer load balancer devices 320a-320c, also referred to hereinafter either individually or collectively as first-layer load balancer(s) 320, second-layer load balancers 325a-325c, also referred to hereinafter either individually or collectively as second-layer load balancer(s) 325, and multiple server clusters, e.g., clusters 330a-330c also referred to hereinafter either individually or collectively as cluster(s) 330. Each of the clusters 330a-330c, includes a number of application instances 331 associated with a service accessed through the anycast address.

An anycast node 310 is configured to forward a received data packet 10, addressed to a corresponding anycast address, to a first-layer LB 320 of one or more first-layer LBs 320. The anycast node 310 determines the first-layer LB 320 for forwarding the data packet based on one or more header fields, e.g., source IP address, destination IP address, and/or source port, of the data packet 10 and a sub-data structure associated with the anycast node 310. Also, the anycast node 310 may de-capsulate the data packet and/or encapsulate it with one or more new headers before forwarding the data packet to the selected first-layer LB 320. Furthermore, the anycast node 310 may check a connection table upon receiving the data packet similar to the anycast node 110 described in relation to FIG. 1.

In some implementations, each first-layer LB 320 includes a first data structure 321 for mapping received data packets to respective second-layer LBs 325. In some instances, the first data structure 321 includes a redundant list of the second-layer LBs 325 such that the frequency with which each second-layer LB 325 is included in the first data structure depends on a weight value associated with the same second-layer LB 325 or a corresponding location. For instance, the weights may reflect the available capacity at each corresponding location, the RTT to each corresponding location, another load balancing criterion, or combinations thereof. The first-layer LB 320 selects a second-layer LB 325 from the corresponding first data structure 321 based on one or more header fields of the data packet 10. The first-layer LB 325 then forwards the data packet 10 to the selected second-layer LB 325. In some instances, the first-layer LB 320 generates a hash value using the header field(s) of the data packet 10 and selects the second-layer LB 325 from the first data structure 321 based on the generated hash value. In other instances, the selection of the second-layer LB 325 by the first-layer LB 320 may be performed similar to the selection of a sub-data structure (stage 250) as described in relation with FIG. 2. The selection of a second layer LB 325 by the first-layer LB 320 may be dependent on checking a connection table by the first-layer LB 320 (similar to stage 230, stage 240 and stage 250 in FIG. 2).

Each second-layer LB 325 is associated with a location, e.g., zone or cluster 330, of the system 300, and includes a corresponding second data structure 326 associated with the same location of the system 300. The second data structure 326 includes a redundant list of application instances associated with the same location. The frequency with which each application instance is included in the second data structure 326 reflects a weight value associated with the same application instance. Such weights may reflect the available capacity at each application instance, the RTT to each application instance, other load balancing criteria, or combinations thereof. The selected second-layer LB 325 receives the data packet 10 and determines an application instance from the corresponding second data structure 326 based on one or more header fields of the data packet 10. For instance, the first-layer LB 320 generates a hash value using the header field(s) of the data packet 10 and selects the second-layer LB 325 from the first data structure 321 based on the generated hash value. In some implementations, each entry of the second data structure 326 includes an IP address, e.g., a destination IP address, associated with a corresponding application instance. The generated hash value can be used as an index of an entry in the second data structure in selecting an IP address. The second-layer LB 325 then forwards the data packet 10 to the determined application instance.

Each cluster 330 includes one or more computer servers, e.g., content delivery servers and/or application servers, that maintain application instances associated with one or more services. In FIG. 3, each of the clusters 330a-330c, includes a number of application instances 331 associated with the application or service accessed through the anycast address to which the data packet 10 was addressed when arriving at the system 300. The application instances 331 in a given cluster 330 may reside in a single computer server, or may be distributed among multiple computer servers of the same cluster 330. The application instances 331 are addressed through corresponding destination IP addresses. The application instance 331 receiving the data packet 10 processes the request associated with the data packet 10. As illustrated in FIG. 3, each cluster 330, or zone, of the system 300 may be served by one or more second-layer LBs 325. For instance, while the cluster 330a is served by the second-layer LB 325a, the cluster 330b is served by two second-layer LBs 325b and 325b'.

Figure 4:
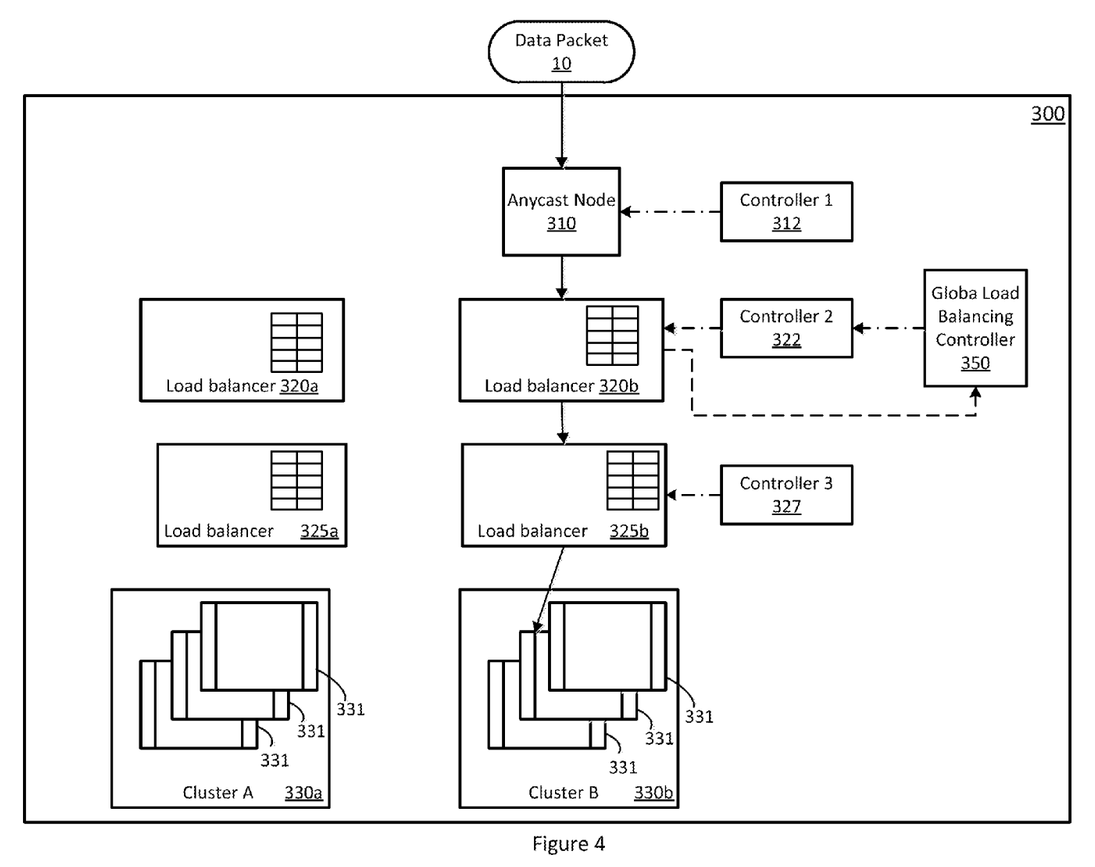
FIG. 4 shows a block diagram representing another implementation of the two-layer load balancing system.

FIG. 4 shows a block diagram of another implementation of the two-layer load balancing system 300. For convenience of illustration, the block diagram shown in FIG. 4 depicts only a single anycast node 310, two first-layer LBs 320a and 320b, two second-layer LBs 325a and 325b, and two clusters 330a and 330b, of the system 300. The system 300 also includes a first controller 312, a second controller 322, a third controller 327, and a global load balancing controller 350.

The first controller 312 includes a network element, a computer server, or another electronic device. The first controller 312 configures the anycast node 310, with information such as the source IP map, connection table, and/or other information employed by the anycast node 310 in handling received data packets 10 addressed to a corresponding anycast address. The first controller 312 may acquire such information from one or more data bases or other devices of the system 300, and provide corresponding updates to the anycast node 310.

The second controller 322 includes a network element, a computer server, or another electronic device. The second controller 322 configures first-layer LBs 320a and 320b, by providing information such as the weights associated with each location, e.g., cluster 330 or zone, of the system 300, routing information for routing data packets to locations of the system 300, a connection table, and/or other information employed by the first-layer LB 320 in handling received data packets 10. The second controller device 322 may acquire such information from the global load balancing controller 350, one or more databases, or other devices of the system 300, and provide corresponding updates to the first-layer LB 320.

The third controller 327 includes a network element, a computer server, or another electronic device. The third controller 327 configures the second-layer LBs 325a and 325b, by providing information such as the weights associated with each application instance 331 in a corresponding location of the system 300, routing information for routing data packets 10 to application instances 331, and/or other information employed by the second-layer LB 320 in handling received data packets 10. The third controller 327 may acquire such information from the one or more databases or other devices of the system 300, and provide corresponding updates to the second-layer LB 320.

In FIG. 4, the continuous lines between different components of the system 300 indicate the data packet path (also referred to as the data plane), the dashed lines indicate the flow of configuration information/instructions (also referred to as the control plane), and the break lines indicate feedback paths (which may also be part of the control plane). In some implementations, each time the first-layer LB 320 forwards a data packet to a location, or a corresponding second-layer LB 325, of the system 300, the first-layer LB 325 reports the forwarding to the global load balancing controller 350. Also, the second-layer LB 325 may report the forwarding of the data packet 10 to the global load balancing controller 350 and/or to another device of the system 300. The global load balancing controller 350 uses the information reported by the first-layer LB 320 to update weights associated with different locations of the system 300. The information reported by the second-layer LB 325 is used by the global load balancing controller 350, or a device local at the location associated with the second-layer LB 325, to update weights associated with different application instances 331. In some implementations, the clusters 330 can be configured to provide status information of its servers or application instances 331 to the global load balancing controller 350 and/or other devices in the system 300. The global load balancing controller 350 or another device in the system 300 can use the information reported by the clusters 330 to update weights associated with different application instances 331. In some implementations, the global load balancing controller 350 also obtains data from routers and/or network elements regarding link congestions.

Figure 5:
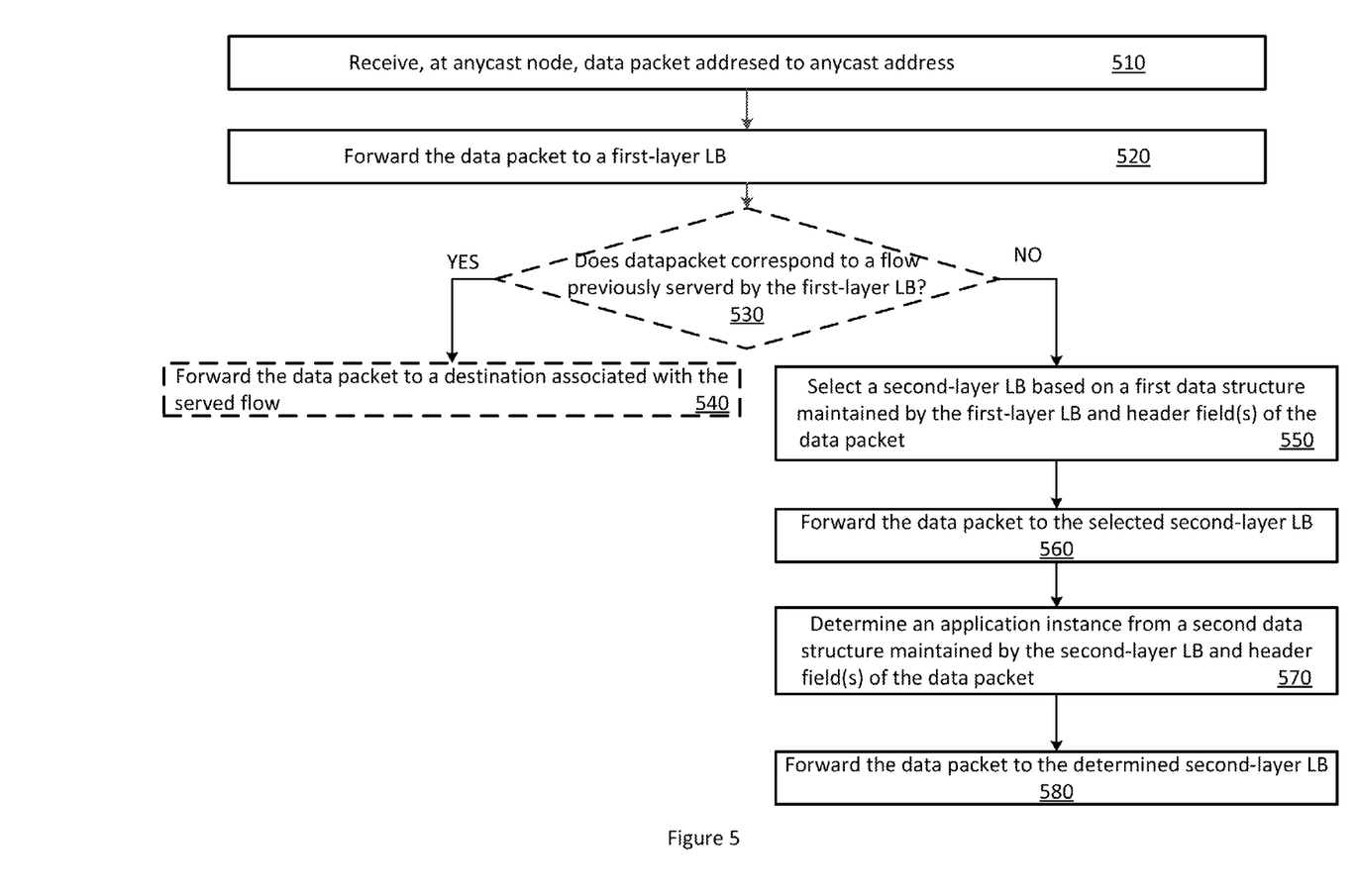
FIG. 5 shows a flowchart describing an implementation of a process of handling anycast data packets performed by the two-layer load balancing system.

FIG. 5 shows a flowchart describing an implementation of a process 500 of processing anycast data packets performed by the two-layer load balancing system 300. The process 200 includes the processes of receiving by an anycast node 310 a data packet 10 addressed to an anycast address (stage 510), forwarding by the anycast node 310 the received data packet 10 to a first-layer LB 320 (stage 520), determining by the first-layer LB 320 if the data packet is associated with a previously served flow or session (stage 530), if the data packet 10 is determined to be associated with a previously served flow or session forwarding the data packet 10 to an application instance associated with the previously served data flow or session (stage 540), otherwise selecting a second-layer LB 325 based on a first data structure maintained by the first-layer LB 320 and one or more header fields of the data packet 10 (stage 550), forwarding the data packet to the selected second-layer LB 325 (stage 560), determining by the selected second-layer LB 325 an application instance 331 based on a second data structure maintained by the second-layer LB 325 and one or more header fields of the data packet 10 (stage 570), and forwarding the data packet to the determined application instance (stage 580).

The stages 510-540 of the process 500 are similar to the stages 210-240 of the process 200 described in relation with FIG. 2, except that the first-layer LB 325 (shown in FIGS. 3 and 4) is used instead of the load balancer 120 (shown in FIG. 1). Also, stages 530 and 540 are optional since the checking of the connection table may be performed by another device, other than the first-layer LB 320. The first layer LB 320 receiving the data packet 10 selects a second layer LB 325 based on a first data structure 321 maintained by the first-layer LB 320 and one or more header fields of the data packet 10 (stage 550). The first data structure 321 includes a redundant list of second-layer LBs 325 or corresponding locations, e.g., clusters 330 or zones, in the system 300. The frequency with which each second-layer LB 325, or a corresponding location, is included in the first data structure 321 depends on weight value associated with same corresponding location. The weights may reflect the available capacity at each corresponding location, the RTT to each corresponding location, another load balancing criterion, or combinations thereof. In some instances, the first-layer LB 320 generates a hash value using the header field(s) of the data packet 10 and selects the second-layer LB 325 from the first data structure 321 based on the generated hash value. For instance, the first-layer LB 320 uses the generated hash value modulo the size of the first data structure as an index of an entry to be selected from the first data structure. The first-layer LB 320 then forwards the data packet to the selected second-layer LB 325, or to a second-layer LB 325 associated with the selected location (stage 560).

The second-layer LB 325 receiving the data packet 10 determines an application instance 331 based on a second data structure 326 maintained by the second-layer LB 325 and one or more header fields of the data packet 10 (stage 570). The second data structure 326 includes a redundant list of application instances 331. The frequency with which each application instance 331 is included in the second data structure 326 depends on weight values associated with the application instances 331. The weights may reflect the available capacity at each corresponding application instance 331, the RTT to each corresponding application instance 331, other load balancing criteria, or combinations thereof. The second-layer LB 325 generates a hash value using the header field(s) of the data packet 10 and determines the application instance 331 from the second data structure 326 based on the generated hash value. For instance, the second-layer LB 325 uses the generated hash value modulo the size of the second data structure 326 as an index of an entry to be selected from the second data structure 326. The second-layer LB 325 then forwards the data packet 10 to the determined application instance 331 (stage 580).

Figure 6:
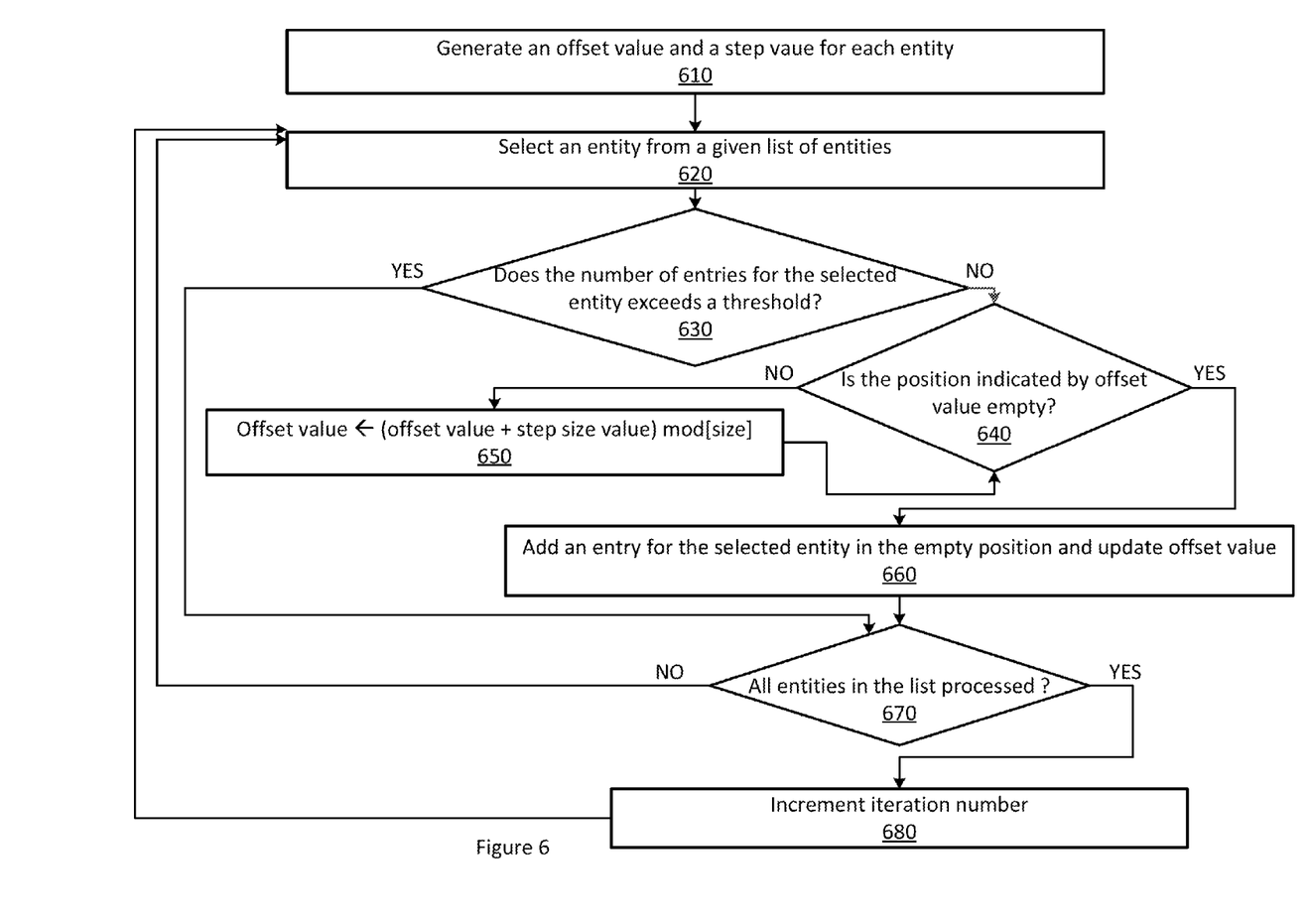
FIG. 6 shows a flowchart describing an implementation of a process for generating a data structure employed by load balancers.

FIG. 6 shows a flowchart describing an implementation of a process 600 for generating a redundant list employed by load balancers. For instance, given a list of entities each being associated with a corresponding weight value, a prime number, larger than the number of entities in the list, is chosen as the size of the redundant list to be generated. A processor executing the process 600 selects an offset value and a step value for each entity in the given list of entities (stage 610). The processor then selects an entity from the given list of entities (stage 620). The selection can be done based on a pseudorandom permutation of identifications (such as names, portions of names, identification strings, or the like) of the entities. The processor compares the number of entries already included in the redundant list for the selected entity to a corresponding dynamic threshold value (stage 630). For instance, the dynamic threshold value is defined as the weight corresponding to the selected entity multiplied by an iteration number. If the number of entries already included is found to be smaller than the dynamic threshold value at (stage 630), the processor checks if the position indicated by the offset value in the redundant list to be generated is empty (stage 640). If the position indicated by the offset value is not found empty, the processor updates the offset value by incrementing it with the corresponding step value and truncating the incremented value modulo the size of the redundant list (stage 650). The processor then checks if the position indicated by the updated offset value is empty (stage 640). The stages 650 and 640 are repeated until an empty position is detected. If at any point, the result of the process (stage 640) indicates an empty position, the processor adds an entry corresponding to the selected entity at the empty position (stage 660). Once an entry for the selected entity is added in the redundant list (stage 660), or the number of already added entries for the selected entity is found to be larger than the dynamic threshold at (stage 630), the processor then checks if all the entities in the given list have been processed in the current iteration (stage 670). If not all entities in the given list have been processed, the processor selects a new entity from the given list for processing (stage 620). otherwise, the processor increments the iteration number (stage 680), and then selects an entity from the given list for processing (stage 620). The processor iterates through the stages depicted in FIG. 6 until the redundant list is full.

The process 600 generates the redundant list as one-dimensional table, e.g., a row or column, a tree, a sub-tree, or any other data structure. The entities in the given list may be application instances 131 or 331, load balancers 120 or 325, or locations of a load balancing system 100 or 300. In the generated redundant list, the frequency with which each entity is repeated is dependent on the weight value corresponding to the same entity. In instances where the size of the redundant list is chosen to be much larger than the total number of entities in the give list, e.g., 100 times larger, the frequencies with which the entities are included in the redundant list becomes almost proportional to the corresponding weights. The larger the sized of the generated redundant list relative to the number of entities in the given list, the more accurate is the proportionality between the frequencies and the weights of the same entities.

Figure 7:
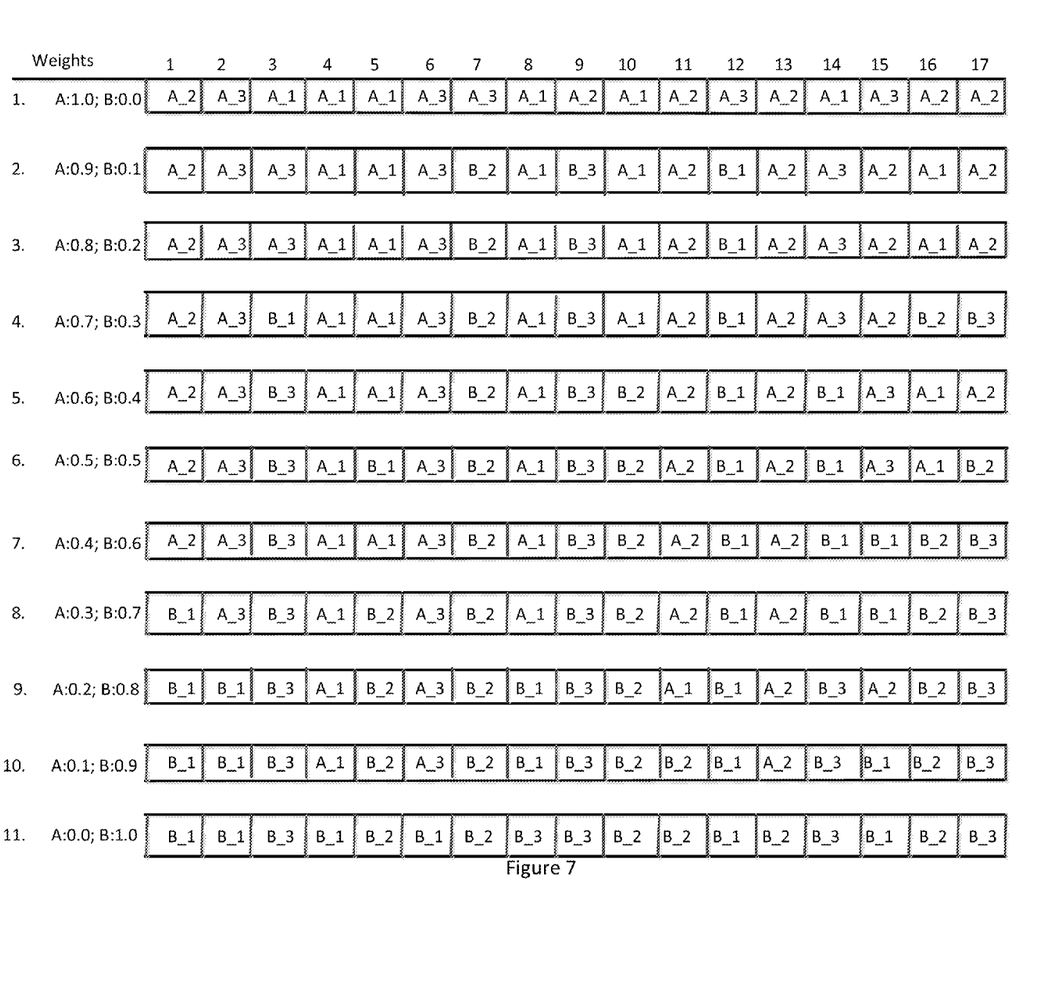
FIG. 7 shows illustrations of data structures employed by systems in FIGS. 1 and 3.

FIG. 7 shows illustrations of data structures employed by systems in FIGS. 1 and 3. Considering three application instances A_1, A_2, and A_3 of a cluster A, e.g., clusters 130a or 330a, and three application instances B_1, B_2, and B_3 of a cluster B, e.g., clusters 130b or 330ba, each row of the table in FIG. 7 depicts a sample output, with size equal to 17, of the process 600 (shown in FIG. 6) generated based on corresponding sets of weights. For instance, the first row corresponds to an output where the weights associated with each application instance A_1, A_2, and A_3 are equal to 1.0 and the weights associated with the application instances B_1, B_2, and B_3 are equal to 0.0. Going from any row to the next, the weight value for the application instances A_1, A_2, and A_3 is decremented by 0.1, and the weight value for the application instances B_1, B_2, and B_3 is incremented by 0.1.

As the weights associated with the application instances change slowly from one row to the next in the table shown in FIG. 7, only few changes are observed from one row to the next. In fact, by examining the columns of the table of FIG. 7, one can see that only few changes occur across each column as the weights slightly change from one row to the next.

Consider a scenario where the cluster 130a of FIG. 1 includes the application instances A_1, A_2, and A_3 and that each of these application instances is experiencing an overflow. The overflow demand, e.g., 20%, is to be redirected to the next closest cluster with available capacity, e.g., cluster 130b of FIG. 1 including application instances B_1, B_2, and B_3. As such, a weight value of 0.8 is associated with each of the application instances A_1, A_2, and A_3, and a weight value of 0.2 is associated with each of the application instances B_1, B_2, and B_3 with respect to anycast traffic associated with the cluster 130a of FIG. 1. In such, a case the third row of the table in FIG. 7 represents a sample of a sub-data structure associated with the cluster 130a of FIG. 1. Also, given that the application instances B_1, B_2, and B_3 have enough bandwidth to serve anycast traffic coming to cluster 130*b*, these application instances will all have equal weight of 1.0 when it comes to anycast traffic associated with the cluster 130*b* shown in FIG. 1. As such, the last row of the table in FIG. 7 represents a sample of the sub-data structure associated with the cluster 130*b* of FIG. 1.

Comparing any pair of consecutive rows, one can observe that only few entries change from one row to the next. Such observation indicates that a small change in the weight values (the weight values change by ±0.1 from one row to next one) has a slight effect on data paths. Adding or removing one application instance associated with a small weight value would also have slight effect on the entries of the respective row or sub-data structure. The way rows or sub-data structures are generated (using the process 600 shown in FIG. 6) results in consistency in assigning new requests to respective application instances 131 or 331 (shown in FIGS. 1 and 3). In some implementations, small changes in weight values and/or adding/removing application instances associated with small weights would not result in rerouting of data traffic (or re-computing routing tables at network routers or other network elements) since such changes have slight effect on load balancing data traffic.

Considering a similar scenario, e.g., with the same weights as discussed in the previous paragraph, where the application instances are associated with the cluster 330*a* of FIG. 3, and the application instances B_1, B_2, and B_3 are associated with the cluster 330*b* of FIG. 3, then the third row of the table in FIG. 7 represents a sample of the second data structure 326 associated with the cluster 330*a* of FIG. 3. Also, the last row of the table in FIG. 7 represents a sample of the second data structure 326 associated with the cluster 330*b* of FIG. 3.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A system for load balancing anycast traffic in a communications network, comprising:
   a first set of load balancing (LB) devices, each LB device of the first set of LB devices being configured to:
      maintain a first data structure including entries associated with application instances in a group of application instances served by the LB device of the first set of LB devices, the frequency with which each served application instance is included in the first data structure being indicative of a weight value associated with a capacity of the corresponding served application instance;
      upon receiving a data packet, received at the system addressed to an anycast address, generate a first hash value based on one or more first header fields of the received data packet;
      using the first data structure, identify a virtual Internet protocol (IP) address of one of the served application instances based on the generated first hash value; and
      forward the data packet to the identified application instance;
   a second set of load balancing (LB) devices, each LB device of the second set of LB devices being configured to:
      maintain a second data structure including entries associated with respective LB devices in the first set, the frequency with which each LB device in the first set of LB devices is included in the second data structure being indicative of a weight value associated with the corresponding LB device of the first set;
      upon receiving a data packet, received at the system addressed to the anycast address, generate a second hash value based on one or more second header fields of the received data packet;
      identify a LB device of first set of LB devices using the second data structure, based on the generated second hash value; and
      forward the data packet to the identified LB device of the first set; and a plurality of anycast nodes broadcasting the anycast address and configured to:
- upon receiving, at a first anycast node of the plurality of anycast nodes from a client device, a first data packet addressed to the anycast address, forward the first data packet to a LB device of the second set of LB devices; and
- upon receiving, at a second anycast node of the plurality of anycast nodes from the client device, a second data packet addressed to the anycast address, forward the second data packet to the LB device of the second set of LB devices.

2. The system of claim 1, wherein the LB device of the second set of LB devices is further configured to report traffic load forwarded to each LB device of the first set of LB devices to a global LB element.

3. The system of claim 2, wherein the global LB element is configured to generate weights associated with LB devices of the first set of LB devices based at least in part on received reports of forwarded traffic loads from LB devices of the second set of LB devices to LB devices of the first set of LB devices.

4. The system of claim 1, wherein the weight value associated with the corresponding LB device of the first set is indicative of a capacity of the group of processing devices served by the corresponding LB device of the first set.

5. The system of claim 1, wherein the application instances are associated with at least one of an application server, a content server, and a virtual machine.

6. The system of claim 1, wherein each LB device of the second set of LB devices is further configured to:
- receive a weight value for one or more LB devices in the first set of LB devices; and
- generate the second data structure based on the received weight values for the one or more LB devices in the first set of LB devices.

7. The system of claim 6, wherein in generating the second data structure, each LB device of the second set of LB devices is further configured to:
- select a number of empty data structure positions for each LB device of the first set of LB devices, the number of selected data structure positions being determined based on the weight value corresponding to the LB device of the first set of LB devices; and
- insert an IP address of the LB device of the first set of LB devices in each of the selected empty data structure positions.

8. The system of claim 7, wherein each LB device of the second set of LB devices is further configured to select the number of empty data structure positions for each LB device of the first set of LB devices based on an offset value associated with the LB device of the first set of LB devices.

9. The system of claim 1, wherein each LB device of the first set of LB devices is further configured to:
- receive a weight value for each application instance in the group of application instances served by the LB device of the first set of LB devices; and
- generate the first data structure based on the received weight values for application instances in the group served by the LB device of the first set of LB devices.

10. The system of claim 9, wherein in generating the first data structure, each LB device of the first set of LB devices is further configured to:
- select a number of empty data structure positions for each application instance of the group served by the LB device of the first set of LB devices, the number of selected data structure positions being determined based on the weight value corresponding to the application instance; and
- insert a virtual IP address of the application instance in each of the selected empty data structure positions.

11. The system of claim 10, wherein each LB device of the first set of LB devices is further configured to select the number of empty data structure positions for each application instance of the group served by the LB device of the first set of LB devices based on an offset value associated with the application instance.

12. A method for data traffic load balancing, comprising:
- maintaining, by each load balancing (LB) device of a first set of LB devices, a first data structure including entries associated with application instances in a group of application instances served by the LB device of the first set of LB devices, the frequency with which each served application instance is included in the first data structure being indicative of a weight value associated with a capacity of the corresponding served application instance;
- upon receiving a data packet, received at a LB system addressed to an anycast address, generating a first hash value based on one or more first header fields of the received data packet;
- using the first data structure, identify a virtual Internet protocol (IP) address of one of the served application instances based on the generated first hash value; and
- forwarding the data packet to the identified application instance;
- maintaining, by a LB device of a second set of LB devices, a second data structure including entries associated with respective LB devices in the first set, the frequency with which each LB device in the first set of LB devices is included in the second data structure being indicative of a weight value associated with the corresponding LB device of the first set;
- upon receiving a data packet, received at the LB system addressed to the anycast address, generating a second hash value based on one or more second header fields of the received data packet, the data packet being received at the LB system addressed to the anycast address;
- identify a LB device of first set of LB devices using the second data structure, based on the generated second hash value;
- forwarding the data packet to the identified LB device of the first set of LB devices;
- broadcasting the anycast address by a plurality of anycast nodes;
- upon receiving, at a first anycast node of the plurality of anycast nodes from a client device, a first data packet addressed to the anycast address, forwarding the first data packet to a LB device of the second set of LB devices; and
- upon receiving, at a second anycast node of the plurality of anycast nodes from the client device, a second data packet addressed to the anycast address, forwarding the second data packet to the LB device of the second set of LB devices.

13. The method of claim 12 further comprising reporting, by the LB device of the second set of LB devices, traffic load forwarded to each LB device of the first set of LB devices to a global LB element.

14. The method of claim 13 further comprising generating, by the global LB element, weights associated with LB devices of the first set of LB devices based at least in part on received reports of forwarded traffic loads from LB devices of the second set of LB devices to LB devices of the first set of LB devices.

15. The method of claim 12, wherein the weight value associated with the corresponding LB device of the first set of LB devices is indicative of a capacity of the group of application instances served by the corresponding LB device of the first set of LB devices.

16. The method of claim 12, wherein the application instances are associated with at least one of an application server, a content server, and a virtual machine.

17. The method of claim 12 further comprising:
receiving, by the LB device of the second set of LB devices, a weight value for one or more LB devices in the first set of LB devices; and
generating the second data structure based on the received weight values for the one or more LB devices in the first set of LB devices.

18. The method of claim 17, wherein generating the second table includes:
selecting a number of empty data structure positions for each LB device of the first set of LB devices, the number of selected data structure positions being determined based on the weight value corresponding to the LB device of the first set of LB devices; and
inserting an IP address of the LB device of the first set in each of the selected empty data structure positions.

19. The method of claim 18, wherein selecting the number of empty data structure positions for each LB device of the first set of LB devices includes selecting the number of empty data structure positions based on an offset value associated with the LB device of the first set of LB devices.

20. The method of claim 12 further comprising:
receiving, by the LB device of the first set, a weight value for each application instance in the group of application instances served by the LB device of the first set of LB devices; and
generating the first data structure based on the received weight values.

21. The method of claim 20, wherein generating the first data structure includes:
selecting a number of empty data structure positions for each application instance of the group served by the LB device of the first set of LB devices, the number of selected data structure positions being determined based on the weight value corresponding to the application instance; and
inserting a virtual IP address of the application instance in each of the selected empty data structure positions.

22. The method of claim 21, wherein selecting the number of empty data structure positions for each application instance includes selecting the number of empty data structure positions based on an offset value associated with the application instance.

* * * * *